3,179,399
HIGH ENERGY DAMPING SPRING
Richard T. Ellis, Clarksville, Md., assignor to the United States of America as represented by the Secretary of the Navy
Filed Jan. 31, 1963, Ser. No. 255,417
4 Claims. (Cl. 267—1)

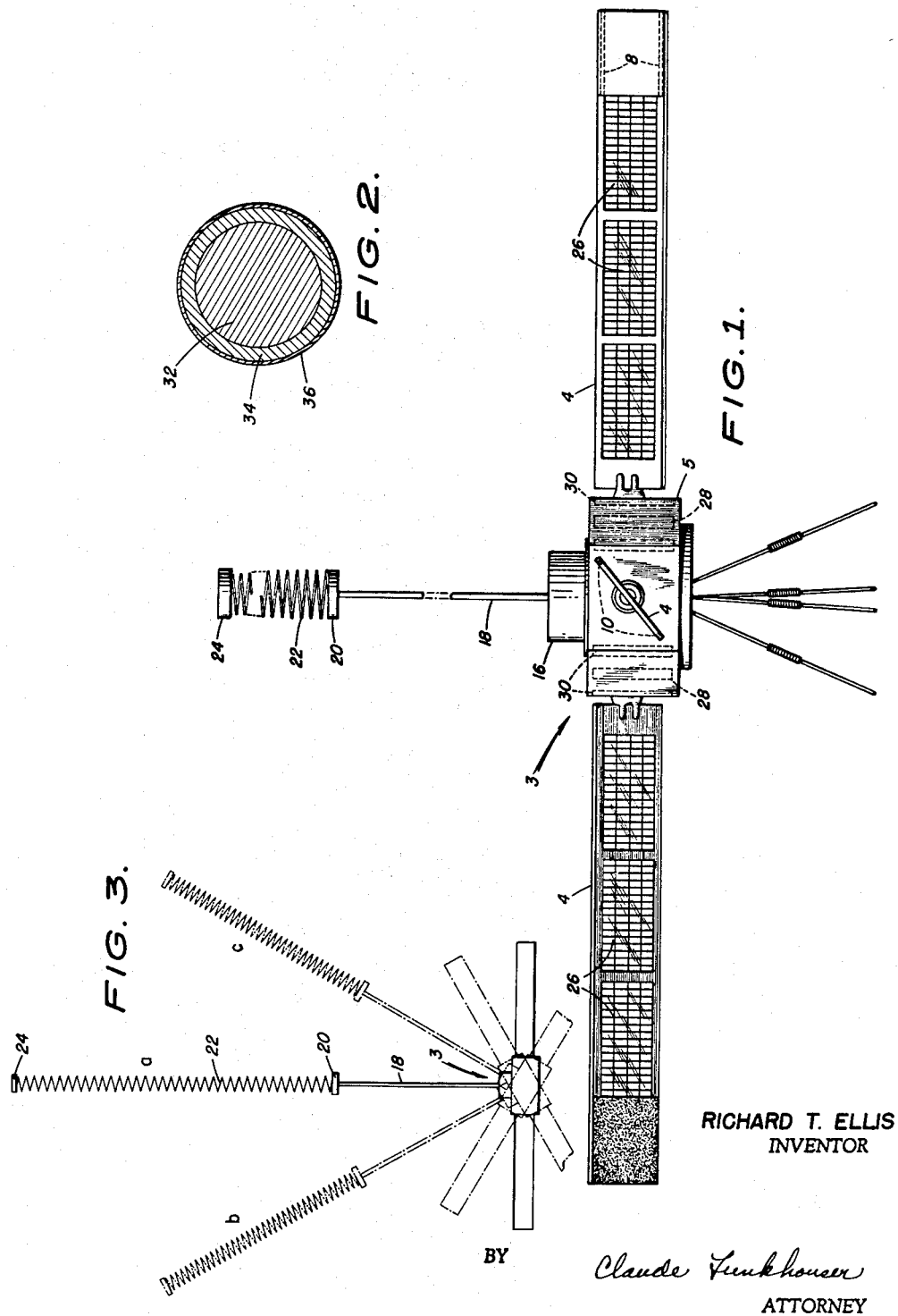

This invention relates in general to energy absorption springs and, more particularly, to an improved energy absorption spring suitable for absorbing libration energy about the stabilized axis of a gravity gradient stabilized satellite.

Gravity orientation requires that the axial moment of inertia be less than the transverse moment, as fully described by R. E. Fischell in his article entitled "The TRAAC Satellite," publihsed in the January-February 1962 issue of the APL Technical Digest, published by the Applied Physics Laboratory of The Johns Hopkins University. This article describes the forces acting on a satellite and why a dumbbell shaped satellite may become gravity oriented.

Additionally, G. M. Schindler, in his article entitled "On Satellite Librations," published in the May, 1959 issue of the American Rocket Society Journal, describes the forces acting on a dumbbell shaped satellite making it oscillate about an attitude of equilibrium somewhat like a pendulum. The instant invention is an ultra-weak spring deployed from an orbiting satellite and used to dissipate the energy of the oscillations, thereby stopping said oscillations, as described by Robert R. Newton in his U.S. patent application "System for Gravity Orienting a Satellite," Serial No. 249,961 filed January 7, 1963, now Patent No. 3,148,846, dated Sept. 15, 1964.

One object of the present invention, therefore, resides in the provision of any energy absorption spring that is weak enough that the slight difference between gravitational forces acting on either end of the axis of an orbiting satellite can deploy it to a considerable length.

Another object of the invention is to provide an energy absorption spring that is coated with a mechanically soft metal to increase its absorption capacity.

A further object of the invention is to provide an energy absorption spring suitable for operating in a space environment.

Other objects and many of the attendant advantages of this invention will be readily appreciated as the same becomes better understood by reference to the following detailed description when considered in connection with the accompanying drawings, wherein:

FIG. 1 is a side elevation of a satellite utilizing the invention;

FIG. 2 is a cross-section of the wire used to form the ultra-weak spring, and

FIG. 3 is a schematic representation of the angular librations of a gravity stabilized satellite, showing the contraction of the ultra-weak spring constituting the instant invention, whereby the energy of the librations is absorbed.

Briefly, the invention contemplates the use of a spring formed from a strand of wire having an inner core of beryllium-copper, a layer of mechanically soft metal deposited upon the beryllium-copper core, and a protective coating of either gold or silver.

In FIG. 1, a satellite 3 is shown having a plurality of blades 4 extending outwardly from the sides of the satellite body 5, and symmetrically disposed thereabout. A pair of despin rods 8 is located within one blade 4 and a second pair 10 is located within another blade 4 that extends in a plane perpendicular to the plane of the first blade.

A boom housing 16, positioned atop the satellite body 5, contains the mechanism used to gravitationally orient the satellite, and is shown with its boom 18 in extended position. A weight 20 is positioned on the outer end of the boom 18.

The energy absorption spring constituting the instant invention is shown at 22 and has a weight 24 attached to its outer end, the inner end of the spring being connected to said weight 20. A plurality of solar cells 26, mounted on each blade 4, generates electrical energy to charge a plurality of batteries 28 disposed within the body 5. The batteries 28 will furnish the power to operate a plurality of electromagnets 30 which form a part of the magnetic stabilization system, as described by Fischell et al. in their U.S. patent application entitled "Magnetic Satellite System," Serial No. 99,644, filed March 30, 1961. For convenience the batteries 28 and magnets 30 are shown schematically and in dotted lines, since they form no part of the present invention.

Referring to FIG. 2, wherein a portion of the spring 22 constituting the instant invention is shown in cross-section, it will be seen that said spring includes an inner beryllium-copper core 32, which core may be 0.007 inch in diameter. Beryllium-copper can be deformed without significant energy loss; therefore, to obtain good damping, a layer of mechanically soft material 34, such as an 0.0008 inch layer of cadmium, is electrolytically deposited on the outer surface of the core 32. To prevent the cadmium from subliming in the hard vacuum of space, a protective layer of silver 36 is electrolytically deposited on the outer surface of the cadmium layer 34. The layer of silver 36 may be 0.0002 inch in thickness.

The spring above-described is, as best seen in FIG. 1, of generally frusto-conical shape and has a constant of one and one-half millionths, with the result that it is of such weakness that the slight difference between gravitational forces acting on the satellite could deploy it to a considerable length. The spring is also weak enough that the oscillations of the satellite, with a natural period of about one hour, would cause appreciable spring motion, as seen in FIG. 3, producing a finite energy loss for each oscillation.

FIG. 3 is a schematic representation showing the method by which the spring absorbs libration energy and damps out the libration about the gravity stabilized axis. In position $a$, the spring 22 is fully extended under the existing conditions, but as it swings to position $b$, it contracts, thereby absorbing some energy. As the satellite begins to move to position $c$, it passes again through position $a$, where the spring is again extended under the gravity gradient forces, absorbing an additional amount of energy, and the satellite, continuing on to position $c$, absorbs further libration energy when the spring contracts again. By this repetitive process, all the libration energy is absorbed and the satellite gradually becomes oriented, having one side always facing the earth.

A second embodiment of the spring, not shown, may consist of an inner beryllium-copper wire 0.008 inch in diameter which is plated with a cadmium silver compound to a diameter of 0.0096 inch and then overplated with gold to a diameter of 0.010 inch. The cadmium silver compound comprises 99% approximately, of cadmium by weight and 1% of silver by weight. The spring of this embodiment is wound as a cylinder 7.625 inches in diameter and has 80 turns; and its equilibrium length in orbit is 40 ft. The above limits and specifications can be varied to obtain different configurations but those mentioned have been found to be satisfactory.

Obviously, many modifications and variations of the present invention are possible in the light of the above teachings. It is therefore to be understood that within the scope of the appended claims the invention may be practiced otherwise than as specifically described.

What is claimed is:
1. An ultra-weak absorption spring comprising,
   a beryllium-copper core having a diameter of between 0.005 and 0.01 inch, said core being formed in a helical coil of generally frusto-conical shape,
   a layer of mechanically soft material electrolytically deposited on said core, and
   a protective layer of an electrolytically deposited, non-sublimable metal on the surface of said mechanically soft material.
2. An energy absorption spring as recited in claim 1, wherein said layer of soft material is cadmium and has a thickness of between 0.0008 and 0.0016 inch.
3. An energy absorption device as recited in claim 1, wherein the thickness of said protective layer of non-sublimable material is between 0.0002 and 0.0004 inch.
4. An energy absorption spring as recited in claim 3, wherein said mechanically soft material comprises,
   99% of cadmium by weight, and
   1% of silver by weight.

References Cited by the Examiner
UNITED STATES PATENTS

| | | | |
|---|---|---|---|
| 170,973 | 12/75 | Tyler | 267—1 X |
| 989,958 | 4/11 | Frahm | 188—1 |
| 2,243,217 | 5/41 | Lorini | 267—1 |
| 3,052,440 | 9/62 | Bauer et al. | 188—1 |

FOREIGN PATENTS

| | | | |
|---|---|---|---|
| 560,465 | 4/44 | Great Britain. | |

ARTHUR L. LA POINT, *Primary Examiner.*